United States Patent Office 3,745,112
Patented July 10, 1973

3,745,112
PLATINUM-TIN UNIFORMLY DISPERSED HYDROCARBON CONVERSION CATALYST AND PROCESS
Richard E. Rausch, Mundelein, Ill., assignor to Universal Oil Products Company, Des Plaines, Ill.
No Drawing. Continuation-in-part of application Ser. No. 807,910, Mar. 17, 1969. This application Nov. 23, 1971, Ser. No. 201,576
Int. Cl. B01j *11/08;* C10g *35/08*
U.S. Cl. 208—139
17 Claims

ABSTRACT OF THE DISCLOSURE

A catalytic composite comprising a combination of catalytically effective amounts of a platinum group component, a tin component and a halogen component with a porous carrier material is disclosed. The platinum group, tin and halogen components are present in the composite in amounts, calculated on an elemental basis, of about 0.01 to about 2 wt. percent plantinum group metal, about 0.01 to about 5 wt. percent tin, and about 0.1 to about 3.5 wt. percent halogen. Moreover, the tin component is uniformly dispersed throughout the porous carrier material in a particle size having a maximum dimension less than 100° A., and substantially all of the platinum group component is present as the elemental metal and substantially all of the tin is present in an oxidation state above that of the elemental metal. The principal utility of the subject composite is in the conversion of hydrocarbons, particularly in the reforming of a gasoline fraction. A specific example of the catalyst disclosed is a combination of a platinum group metal, tin oxide and halogen with an alumina carrier material wherein the tin oxide component is uniformly dispersed throughout the alumina carrier material in a relatively small particle size and wherein the composite contains on an elemental basis 0.01 to 2 wt. percent platinum metal, 0.01 to 5 wt. percent tin and about 0.1 to 3.5 wt. percent halogen.

CROSS-REFERENCES TO RELATED APPLICATIONS

This application is a continuation-in-part of my prior, copending application Ser. No. 807,910 which was filed on March 17, 1969.

DISCLOSURE

The subject of the present invention is a novel, bimetallic catalytic composite which has exceptional activity, selectivity, and resistance to deactivation when employed in a hydrocarbon conversion process that requires a catalyst having both a hydrogenation-dehydrogenation function and an acid function. More precisely, the present invention involves a novel, bimetallic dual-function catalytic composite which utilizes a catalytic component, tin, which traditionally has been thought of and taught to be an undesired ingredient of a platinum group metal-containing catalyst because of its close proximity to lead (a known poison for platinum) in the Periodic Table, to interact with a platinum-containing catalyst to enable substantial improvements in hydrocarbon conversion processes of the type that have traditionally utilized platinum metal-containing catalysts to accelerate the various hydrocarbon conversion reactions associated therewith. In another aspect this invention concerns the improved processes that are produced by the use of a catalytic composite comprising a combination of a platinum group component, a tin component and a halogen component with a porous, high surface area carrier material in a manner such that the tin component is uniformly dispersed throughout the porous carrier material in a relatively small particle size and such that the oxidation states of the metallic ingredients are carefully controlled so that substantially all of the platinum group component is present as the elemental metal and substantially all of the tin component is present in an oxidation state above that of the elemental metal. In a specific aspect, the present invention concerns an improved reforming process which utilizes the disclosed bimetallic catalyst to markedly improve activity, selectivity, and stability characteristics associated therewith, to increase yields of $C_5{}^+$ reformate and of hydrogen recovered therefrom and to allow operation thereof at high severity conditions not heretofore generally employed in the art of continuous reforming process.

Composites having a hydrogenation-dehydrogenation function and a cracking function are widely used today as catalysts in many industries, such as the petroleum and petro-chemical industry, to accelerate a wide spectrum of hydrocarbon conversion reactions. Generally, the cracking function is thought to be associated with an acid-acting material of the porous adsorptive, refractory oxide type which is typically utilized as the support or carrier for a heavy metal component such as the metals or compunds of metals of Groups V through VIII of the Periodic Table to which are generally attributed the hydrogenation-dehydrogenation function.

These catalytic composites are used to accelerate a wide variety of hydrocarbon conversion reactions such as hydrocracking, isomerization, dehydrogenation, hydrogenation, desulfurization, cyclization, alkylation, polymerization, cracking, hydroisomerization, etc. In many cases, the commercial applications of these catalysts are in processes where more than one of these reactions are proceeding simultaneously. An example of this type of process is reforming wherein a hydrocarbon feed stream containing paraffins and naphthenes is subjected to conditions which promote dehydrogenation of naphthenes to aromatics, dehydrocyclization of paraffins to aromatics, isomerization of paraffins and naphthenes, hydrocracking of naphthenes and paraffins, and the like reactions to produce an octane-rich or aromatic-rich product stream. Another example is a hydrocracking process wherein catalysts of this type are utilized to effect selective hydrogenation and cracking of high molecular weight unsaturated materials, selective hydrocracking of high molecular weight materials, and other like reactions, to produce a generally lower boiling, more valuable output stream. Yet another example is an isomerization process wherein a hydrocarbon fraction which is relatively rich in straight-chain paraffin compounds is contacted with a dual-function catalyst to produce an output stream rich in isoparaffin compounds.

Regardless of the reaction involved or the particular process involved, it is of critical importance that the dual-function catalyst exhibit not only the capability to initially perform its specified functions but also that it has the capability to perform them satisfactorily for prolonged periods of time. The analytical terms used in the art to measure how well a particular catalyst performs its intended function in a particular hydrocarbon reaction environment are activity, selectivity, and stability. And for purposes of discussion here these terms are conveniently defined for a given charge stock as follows: (1) activity is a measure of the catalyst's ability to convert hydrocarbon reactants into products at a specified severity level where severity level means the conditions used—that is, the temperature, pressure, contact time, and presence of diluents such as $H_2$; (2) selectivity refers to the amount of desired product or products obtained relative to the amount of reactants converted or charged; (3) stability refers to the rate of change with time of the activity and selectivity parameters—obviously, the smaller rate implying the more stable catalyst. In a reforming process, for example, activity commonly refers to the amount of conversion that takes place for a given charge stock at a specified severity level and is typically measured by octane number of the $C_5{}^+$ product stream; selectivity usually refers to the relative amount of $C_5{}^+$ yield that is obtained at the particular severity level; and stability is typically equated to the rate of change with time of activity, as measured by octane number of $C_5{}^+$ product and of selectivity, as measure by $C_5{}^+$ yield. Actually, the last statement is not strictly correct because generally a continuous reforming process is run to produce a constant octane $C_5{}^+$ product with a severity level being continuously adjusted to attain this result; and, furthermore, the severity level is for this process usually varied by adjusting the conversion temperature in the reaction zone so that, in point of fact, the rate of change of activity finds response in the rate of change of conversion temperatures and changes in this last parameter are customarily taken as indicative of activity stability.

As is well known to those skilled in the art, the principal cause of observed deactivation or instability of a dual-function catalyst when it is used in a hydrocarbon conversion reaction is associated with the fact that coke forms on the surface of the catalyst during the course of the reaction. More specifically, in these hydrocarbon conversion processes, the conditions utilized typically result in the formation of heavy, high molecular weight, black, solid or semi-solid, carbonaceous material which coats the surface of the catalyst and reduces it activity by shielding its active sites from the reactants. In other words, the performance of this dual-function catalyst is sensitive to the presence of carbonaceous deposits on the surface of the catalyst. Accordingly, the major problem facing workers in this area of the art is the development of more active and selective catalytic composites that are not as sensitive to the presence of these carbonaceous materials and/or have the capability to suppress the rate of formation of these carbonaceous materials on the catalyst. Viewed in terms of performance parameters, the problem is to develop a dual-function catalyst having superior activity, selectivity, and stability. In particular, for a reforming process the problem is typically expressed in terms of shifting and stabilizing the $C_5{}^+$ yield-octane relationship — $C_5{}^+$ yield being representative of selectivity and octane being proportional to activity.

In my prior application I disclosed my finding regarding a dual-function, bimetallic catalytic composite which possesses improved activity, selectivity, and stability when it is employed in a process for the conversion of hydrocarbons of the type which have heretofore utilized dual-function catalytic composites such as processes for isomerization, hydroisomerization, dehydrogenation, desulfurization, denitrogenization, hydrogenation, alkylation, dealkylation, disproportionation, oligomerization, hydrodealkylation, transalkylation, cyclization, dehydrocyclization, cracking, hydrocracking, reforming, and the like processes. In particular, I have previously disclosed that the use of a catalytic composite comprising a combination of a platinum group component, a halogen component and a tin component with a porous refractory carrier material can enable the performance of a hydrocarbon conversion process which has traditionally utilized a dual-function catalyst to be substantially improved. Now I have additionally found that this type of catalyst can be materially and significantly improved if the amounts of the metallic components, their oxidation states and the distribution thereof in the catalytic composite are carefully controlled in the manner indicated herein. More specifically, I have ascertained the precise structural modifications and limitations that enable a substantial improvement in the performance of a platinum-tin bimetallic catalyst when it is utilized in the conversion of hydrocarbons. One essential condition associated with the acquisition of the improved interaction of tin with platinum is the particle size of the tin component; my findings here indicate that it is essential to carefully control the particle size of the tin component so that it is less than 100° A in maximum dimension (i.e. average diameter). Another condition for achieving an improved interaction of tin with the platinum group metal-containing catalyst is the distribution of the tin component in the porous carrier material with which it is combined; my finding here is that it is essential that the tin component be uniformly dispersed throughout the porous carrier material (i.e. its concentration is approximately the same in any divisable portion of the carrier). Yet another condition for this improved performance is associated with the oxidation state of the metallic components in the finished catalyst; my finding here is that best results are obtained when substantially all of the platinum group component is present as the elemental metal and when substantially all of the tin component is present in an oxidation state above that of the elemental metal (e.g. as tin oxide). And a further material limitation necessary for the improvement of the present invention is careful control of the amounts of the catalytic ingredients in the catalyst; my finding on this aspect of the catalyst is that the amounts of the ingredients should be chosen to result in a catalyst containing, on an elemental basis, about 0.01 to 2 wt. percent platinum group metal, about 0.01 to 5 wt. percent tin and about 0.01 to about 3.5 wt. percent halogen.

In the case of a reforming process, one of the principal advantages associated with the use of this novel bimetallic catalyst involves the acquisition of the capability to operate in a stable manner in a high severity operation; for example, a continuous reforming process producing a $C_5{}^+$ reformate having an octane of about 100 F–1 clear and utilizing a relatively low pressure of 50 to about 350 p.s.i.g. In this latter embodiment the principal effect of the tin component is to stabilize the platinum component by providing a mechanism for allowing it to better resist the rather severe deactivation normally associated with these conditions. In short, the present invention essentially involves the finding that the addition of a controlled amount of a tin component to a dual-function hydrocarbon conversion catalyst containing a platinum group component coupled with the uniform distribution of the tin component throughout the catalytic composite in a relatively small particle size and with careful control of the oxidation states of the metallic components, enables the performance characteristics of the catalyst to be sharply and materially improved.

It is, accordingly, one object of the present invention to provide a hydrocarbon conversion catalyst having superior performance characteristics when utilized in a hydrocarbon conversion process. A second object is to provide a bimetallic catalyst having dual-function hydrocarbon conversion performance characteristics that are relatively insensitive to the deposition of hydrocarbonaceous material thereon. A third object is to provide preferred methods of preparation of this catalytic composite which insure the achievement and maintenance of its properties. Another object is to provide an improved reforming catalyst having superior activity, selectivity, and stability when employed in a low pressure reforming process. Yet another object is to provide a dual-function hydrocarbon conversion catalyst which utilizes a relatively inexpensive component, tin, to promote and stabilize a platinum group component. Still another object is to provide a method of preparation of a tin-platinum catalyst which insures that the tin component is in a highly dispersed state during use in the conversion of hydrocarbons.

In one embodiment the present invention is a catalytic composite comprising a combination of a platinum group component, a halogen component, and a tin component with a porous carrier material. The platinum group, tin and halogen components are present in this composite in amounts sufficient to result in the composite containing, on an elemental basis, about 0.01 to about 2 wt. percent of platinum, about 0.01 to about 5 wt. percent tin, and about 0.1 to about 3.5 wt. percent halogen. Furthermore, the tin component is uniformly distributed throughout the porous carrier material in a particle size having a maximum dimension of less than 100° A., and the oxidation states of the metallic ingredients are carefull adjusted to result in a composite having substantially all of the platinum group component present as the elemental metal and substantially all of the tin component present in an oxidation state above that of the elemental metal.

A second embodiment involves a catalytic composite comprising a platinum component, a tin component, and a halogen component with an alumina carrier material. The components are present in amounts sufficient to result in the composite containing, on an elemental basis about 0.05 to about 1 wt. percent of the platinum metal, about 0.1 to about 1 wt. perecnt tin and about 0.5 to about 1.5 wt. percent halogen. Moreover, the tin component is uniformly distributed throughout the alumina carrier material in a particle size having a maximum dimension of less than 100° A., and the oxidation states of the metallic components are adjusted so that substantially all of the platinum component is present as the elemental metal and substantially all of the tin component is present in an oxidation state above that of the elemental metal.

A third embodiment relates to a catalytic composite comprising a combination of the catalytic composite defined above in the first embodiment with a sulfur component in an amount sufficient to incorporate about 0.05 to about 0.5 wt. percent sulfur, calculated on an elemental sulfur basis.

Another embodiment is a catalyst as defined in the first embodiment above wherein the halogen component is chlorine or a compound of chlorine.

Yet another embodiment involves a catalyst as defined above in the first embodiment with the additional qualification that the tin component is tin oxide.

Other objects and embodiments of the present invention relate to additional details regarding preferred catalytic ingredients, amounts of ingredients, suitable methods of composite preparation, operating conditions for use in the hydrocarbon conversion processes, and the like particulars. These are hereinafter given in the following detailed discussion of each of these facets of the present invention.

The improved bimetallic catalyst of the present invention comprises a porous carrier material or support having combined therewith catalytically effective amounts of a platinum group component, a tin component and a halogen component. Considering first the porous carrier material utilized in the present invention, it is preferred that the material be a porous, adsorptive, high surface area support having a surface area of about 25 to about 500 m.²/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke or charcoal; (2) silica or silica gel, clays and silicates including those synthetically prepared and naturally occurring, which may or may not be acid treated; for example, Attapulgus clay, china clay, diatomaceous earth, fuller's earth, kaoline, kieselguhr, pumice, etc.; (3) ceramics, porcelain, crushed firebrick, and bauxite; (4) refractory inorganic oxides such as alumina, titanium, dioxide, zirconium dioxide, chromium oxide, zinc oxide, magnesia, thoria, boria, silica-alumina, silica-magnesia, chromia-alumina, alumina-boria, silica-zirconia, etc.; (5) crystalline alumino-silicates such as naturally occurring or synthetically prepared mordenite and/or faujasite, either in the hydrogen form or in a form which has been treated with multi-valent cations; and, (6) combinations of one or more elements from one or more of these groups. The preferred porous carrier materials for use in the present invention are refractory inorganic oxides with best results obtained with an alumina carrier material. Suitable alumina materials are the crystalline aluminas known as the gamma-, eta-, and theta-alumina with gamma- and eta-alumina giving best results. In addition, in some embodiments the alumina carrier material may contain minor proportions of other well known refractory inorganic oxides such as silica, zirconia, magnesia, etc.; however, the preferred carrier material is substantially pure gamma- or eta-alumina. Preferred carrier materials have an apparent bulk density of about 0.3 to about 0.7 g./cc. and surface area characteristics such that the average pore diameter is about 20 to 300 Angstroms, the pore volume is about 0.1 to about 1 ml./g. and the surface area is about 100 to about 500 m.²/g. In general, best results are typically obtained with a gamma-alumina carrier material which is used in the form of spherical particles having: a relatively small diameter (i.e., typically about 1/16 inch), an apparent bulk density of about 0.5 g./cc., a pore volume of about 0.4 ml./g., and a surface area of about 175 m.²/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide, to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, a particularly preferred form of alumina is the sphere; and alumina spheres may be continuously manufactured by the well known oil drop method which comprises: forming an alumina hydrosol by any of the techniques taught in the art and preferably by reacting aluminum metal with hydrochloric acid, combining the hydrosol with a suitable gelling agent and dropping the resultant mixture into an oil bath maintained at elevated temperatures. The droplets of mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the improved composite of the present invention is a tin component, and it is an essential feature of the present invention that substantially all of the tin components in the composite is in an oxidation state above that of the elemental metal. That is, it is believed that best results are obtained when substantially all of the tin component exists in the catalytic composite in the +2 or +4 oxidation state. Accordingly, the tin component will be present in the composite as a chemical compound such as the oxide, sulfide, halide, oxyhalide, oxysulfide, and the like wherein the tin moiety is in a positive oxidation state, or in chemical combination with the carrier material in a manner such that the tin component is in a positive oxidation state. Controlled reduction experiments with the catalytic composites produced by the preferred methods of preparing the instant catalytic composite (these methods are specifically described in Examples I and II) have established that the tin component in these catalysts is in a positive oxidation state and is not reduced by contact with hydrogen at temperatures in the range of 1000 to 1200° F. It is important to note that this limitation on the oxidation state of the tin component requires extreme care in preparation and use of the present catalysts to insure that it is not subjected to a reducing atmosphere at temperatures above 1200° F. Equally significant is my observation that it is only when the tin component is in a uniformly dispersed state in the carrier material that it has the capability to maintain its positive oxidation state when subjected to hereinafter described prereduction step. Stated another way, if the tin component is not properly dispersed on the support it can be reduced in the prereduction step and result in an inferior catalyst. Based on the evidence currently available it is believed that best results are obtained when the tin component is present in the catalyst as tin oxide. The term "tin oxide" as used herein refers to a coordinated tin-oxygen complex which is not necessarily stoichiometric.

Interrelated with this oxidation state limitation are the factors of dispersion of the tin component in the support and of particle size of the tin component. This interrelationship emanates from my observation that it is only when the tin component is uniformly dispersed throughout the carrier material in a particle size having a maximum dimension less than 100 Angstroms that it can successfully maintain its preferred oxidation state when it is subjected to a high temperature pre-reduction treatment as hereinafter described. Thus it is an essential feature of my invention that the catalytic composite is prepared in a manner selected to meet the stated particle size and uniform dispersion limitations. By the use of the expression "uniform dispersion of the tin component in the carrier material" it is intended to describe the situation where the concentration of the tin ingredient is approximately the same in any divisable portion of the carrier material. Similarly, the expression "particles having a maximum dimension less than 100° A." is intended to denote particles that would pass through a sieve having a 100° A. mesh size if it were possible to make such a sieve.

The tin component may be incorporated into the catalytic composite in any suitable manner known to effectively disperse this component throughout the carrier material in the required particle size. Thus this component may be added to the carrier by a coprecipitation or cogellation of a suitable soluble tin salt with the carrier material, by ion-exchange of suitable tin ions with ions contained in the carrier material when the ion exchange sites are uniformly distributed throughout the carrier, or controlled impregnation of the carrier material with a suitable soluble tin salt under conditions selected to result in penetration of all sections of the carrier material by the tin component. One preferred method of incorporating the tin component involves coprecipitating it during the preparation of the preferred carrier material, alumina. This method typically involves the addition of a suitable soluble tin compound such as stannous or stannic chloride to an alumina hydrosol, mixing these ingredients to obtain a uniform distribution of the tin moiety throughout the sol and then combining the hydrosol with a suitable gelling agent and dropping the resulting mixture into an oil bath etc., as explained in detail hereinbefore. After drying and calcining the resulting gelled carrier material there is obtained an intimate combination of alumina and tin oxide having the required dispersion and particle size. Another preferred method of incorporating the tin component into the catalytic composite involves utilization of a soluble, decomposable compound of tin to impregnate the porous carrier material. In general, the solvent used in this impregnation step is selected on the basis of the capability to dissolve the desired tin compound and to hold the tin moiety in solution until it is evenly distributed throughout the carrier material and is preferably an aqueous, rather strongly acidic solution. Thus the tin component may be added to the carrier material by commingling the latter with an aqueous, acidic solution of suitable tin salt or suitable compound of tin such as stannous bromide, stannous chloride, stannic chloride, stannic chloride pentahydrate, stannic chloride diamine, stannic trichloride bromide, stannic chromate, stannous fluoride, stannic fluoride, stannic iodide, stannic sulfate, stannic tartrate and the like compounds. The acid used in the impregnation solution may be any organic or inorganic acid that is capable of maintaining the pH of the impregnation solution in the range of about $-1$ or less to about 3 and preferably less than 1 during the impregnation step and that does not contaminate the resultant catalyst. Suitable acids are: inorganic acids such as hydrochloric acid, nitric acid, and the like; and strongly acidic organic acids such as oxalic acid, malonic acid, citric acid and the like. A particularly preferred impregnation solution comprises stannic or stannous chloride dissolved in a hydrochloric acid solution containing HCl in an amount corresponding to at least about 5 wt. percent of the carrier material which is to be impregnated. Another useful impregnation solution is stannous or stannic chloride dissolved in an anhydrous alcohol such as ethanol. In general, the tin component can be incorporated either prior to simultaneously with, or after the platinum group component is added to the carrier material. However, I have found that excellent results are obtained when the tin component is incorporated simultaneously with the platinum group component. In fact, I have determined that a preferred aqueous impregnation solution contains chloroplatinic acid, a relatively high amount of hydrogen chloride, and stannic or stannous chloride.

Regardless of which tin compound is used in the preferred impregnation step, it is essential that the tin component be uniformly distributed throughout the carrier material. In order to achieve this objective with an aqueous impregnation solution it is necessary to dilute the impregnation solution to a volume which is approximately equal or substantially in excess of the volume of the carrier material which is impregnated and to add a relatively strong acid such as hydrochloric acid, nitric acid and the like to the impregnation solution in an amount calculated to maintain the pH of the impregnation solution in a range of about $-1$ or less to about 3, preferably less than 1. It is preferred to use a volume ratio of impregnation solution to carrier material of at least 0.5:1 and preferably about 1:1 to about 10:1 or more. Similarly, it is preferred to use a relatively long contact time during the impregnation step ranging from about ¼ hour up to about ½ hour or more before drying to remove excess solvent in order to insure a high dispersion of the tin component into the carrier material. The carrier material is, likewise, preferably constantly agitated during this preferred impregnation step.

This improved bimetallic catalyst also contains a platinum group component. Although the process of the present invention is specifically directed to the use of a catalytic composite containing platinum, it is intended to include other platinum group metals such as palladium, rhodium, ruthenium, osmium, and iridium. The platinum group component, such as platinum, may exist within the final catalytic composite as a compound such as an oxide, sulfide, halide, oxyhalide, oxysulfide, etc., or as an elemental metal or in combination with one or more of the other ingredients of the catalyst. From the evidence currently available it is believed that best results are obtained with this catalyst when substantially all of the platinum group component exists therein in the elemental state and the hereinafter described prereduction step is believed to accomplish this objective. Generally, the amount of the platinum group component present in the final catalyst composite is small compared to the quantities of the other components combined therewith. In fact, the platinum group component generally comprises about 0.01 to about 2 wt. percent of the final catalytic composite, calculated on an elemental basis. Excellent results are obtained when the catalyst contains about 0.05 to about 1 wt. percent of the platinum group metal. The preferred platinum group component is platinum metal, although good results are also obtained when it is palladium metal.

The platinum group component may be incorporated in the catalytic composite in any suitable manner such as coprecipitation or cogellation with the preferred carrier material, or ion exchange or impregnation thereof. The preferred method of preparing the catalyst involves the utilization of a water-soluble, decomposable compound of a platinum group metal to impregnate the carrier material. Thus, the platinum group component may be added to the support by commingling the latter with an aqueous solution of chloroplatinic or chloropalladic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyldichloride, dinitrodiaminoplatinum, palladium dichloride, palladium nitrate, palladium sulfate, etc. The utilization of a platinum group compound containing halogen, such as chloroplatinic or chloropalladic acid, is preferred since it facilitates the incorporation of both the platinum group component and at least a minor quantity of the halogen component in a single step. Hydrogen chloride or the like acid is also generally added to the impregnation solution in order to further facilitate the incorporation of the halogen component and to aid in the distribution of the platinum group component throughout the carrier material. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Another essential constituent of the improved bimetallic catalyst is the halogen component. Although the precise form of the chemistry of the association of the halogen component with the carrier material is not entirely known, it is customary in the art to refer to the halogen component as being combined with the carrier material or with the other ingredients of the catalyst in the form of the halide (e.g. chloride or fluoride). This combined halogen may be either fluorine, chlorine, iodine, bromine, or mixtures thereof. Of these, fluorine and, particularly, chlorine are preferred. The halogen may be added to the carrier material in any suitable manner either during preparation of the carrier material or before or after the addition of the other components. For example, the halogen may be added at any stage of the preparation of the carrier material or to the calcined carrier material as an aqueous solution of a suitable water-soluble halogen-containing compound such as hydrogen fluoride, hydrogen chloride, hydrogen bromide, ammonium chloride, etc. The halogen component or a portion thereof may be combined with the carrier material during the impregnation of the latter with the platinum group component; for example, through the utilization of a mixture of chloroplatinic acid and hydrogen chloride. In another situation, the alumina hydrosol which is typically utilized to form the preferred alumina carrier material may contain halogen and thus contribute at least a portion of the halogen component to the final composite. For reforming, the halogen is combined with the carrier material in an amount sufficient to result in a final composite that contains about 0.1 to about 3.5 wt. percent and preferably about 0.5 to about 1.5 percent by weight of the halogen calculated on an elemental basis. The preferred halogen component is chlorine or a compound of chlorine.

Regarding the amount of the tin component contained in the improved composite, it is preferably sufficient to constitute about 0.01 to about 5 wt. percent of the final composite, calculated on an elemental basis, although substantially higher amounts of tin may be utilized in some cases. Best results are typically obtained with about 0.1 to about 1 wt. percent tin. Irrespective of the absolute amounts of the tin component and the platinum group component utilized, the atomic ratio of tin to the platinum group metal contained in the bimetallic catalyst is preferably selected from the range of about 0.1:1 to about 3:1, with best results achieved at an atomic ratio of about 0.5:1 to 1.5:1. This is particularly true when the total content of the tin component plus the platinum group component in the catalytic composite is fixed in the range of about 0.15 to about 2 wt. percent thereof, calculated on an elemental tin and platinum group metal basis.

In embodiments of the present invention wherein the instant improved catalytic composite is used for dehydrogenation of dehydrogenatable hydrocarbons or for the hydrogenation of hydrogenatable hydrocarbons, it is ordinarily a preferred practice to minimize the amount of the halogen component and to include an alkali or alkaline earth metal component in the composite. More precisely, this optional component is selected from the group consisting of the compounds (e.g. the oxides, sulfides, oxysulfides and the like) of the alkali metals—cesium, rubidium, potassium, sodium, and lithium—and the compounds of the alkaline earth metals—calcium, strontium, barium and magnesium. Generally good results are obtained in these embodiments when this component constitutes about 1 to about 5 wt. percent of the composite, calculated on an elemental basis. Thus in dehydrogenation or hydrogenation embodiments the catalyst of the present invention is a combination of catalytically effective amounts of a platinum group component, a tin component, and an alkali or alkaline earth component with a porous carrier material wherein the limitations on particle size and dispersion of the tin component, on oxidation states and on amounts previously recited are met. The alkali or alkaline earth component preferably exists in the composite in this embodiment in the form of the oxide. In addition, the halogen component should be held to the lowest amount possible or entirely eliminated.

An optional ingredient for the catalyst of the present invention is a Friedel-Crafts metal halide component. This ingredient is particularly useful in hydrocarbon conversion embodiments of the present invention wherein it is preferred that the catalyst utilized have a strong acid or cracking function associated therewith—for example, an embodiment where hydrocarbons are to be hydrocracked or isomerized with the catalyst of the present invention. Suitable metal halides of the Friedel-Crafts type include aluminum chloride, aluminum bromide, ferric chloride, ferric bromide, tin chloride, zinc chloride and the like compounds, with the aluminum halides, particularly aluminum chloride, ordinarily yielding best results. Generally, this optional ingredient can be incorporated into the composite of the present invention by any of the conventional methods for adding metallic halides of this type; however, best results are ordinarily obtained when the metallic halide is sublimed onto the surface of the carrier material according to the preferred method disclosed in U.S. Pat. No. 2,999,074. The component can generally be utilized in any amount which is catalytically effective, with a value selected from the range of about 1 to about 100 wt. percent of the carrier material generally being preferred.

Regardless of the details of how the components of the bimetallic catalyst are combined with the porous carrier material, the final catalyst generally will be dried at a temperature of about 200 to about 600° F. for a period of about 2 to about 24 hours or more, and finally calcined or oxidized at a temperature of about 700° F. to about 1100° F. in an air atmosphere for a period of at least about 0.5 to about 10 hours in order to convert substantially all of the metallic components to the oxide form.

Best results are generally obtained when the halogen content of the catalyst is adjusted during the oxidation step by including a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. percent.

It is essential that the resultant oxidized catalytic composite be subjected to a reduction step with a substantially water-free reduction agent prior to its use in the conversion of hydrocarbons. This step is designed to selectively reduce the platinum component and to insure a uniform and finely divided dispersion of the metallic components throughout the carrier material. Preferably, substantially pure and dry hydrogen (i.e., less than 20 vol. p.p.m. $H_2O$) is used as the reducing agent in this step. A stream of the reducing agent is contacted with the oxidized catalyst at conditions, including a temperaure of about 600° F. to about 1200° F., a gas hourly space velocity of about 100 to 1000 or more $hr.^{-1}$, and for a period of about 0.5 to 10 hours, selected to reduce substantially all of the platinum component to the metallic state while maintaining substantially all of the tin component in an oxidized state. This reduction step may be performed in situ as part of a startup sequence if precautions are taken to predry the plant to a substantially water-free state and if substantially water-free hydrogen is used. Preferably at least the initial portion of the reduction is done slowly (i.e. at lower temperatures) in order to minimize the adverse effects of the water formed by the reduction reaction.

The resulting reduced catalytic composite may, in some cases, be beneficially subjected to a presulfiding step designed to incorporate in the catalytic composite from about 0.05 to about 0.5 wt. percent sulfur calculated on an elemental basis. Preferably, this presulfiding treatment takes place in the presence of hydrogen and a suitable decomposable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide containing about 10 moles of hydrogen per mole of hydrogen sulfide at conditions sufficient to effect the desired incorporation of sulfur, generally including a temperature ranging from about 50° F. up to about 1000° F. It is generally a good practice to perform this presulfiding step under subsatntially water-free conditions.

According to the present invention, a hydrocarbon charge stock and hydrogen are contacted with a bimetallic catalyst of the type described above in a hydrocarbon conversion zone. This contacting may be accomplished by using the catalyst in a fixed bed system, a moving bed system, a fluidized bed system, or in a batch type operation; however, in view of the danger of attrition losses of the valuable catalyst and of well known operational advantages, it is preferred to use a fixed bed system. In this system, a hyrogen-rich gas and the charge stock are preheated by any suitable heating means to the desired reaction temperature and then are passed into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also to be noted that the reactants may be contacted with the catalyst bed in either upward, downward, or radial flow fashion with the latter being preferred. In addition, it is to be noted that the reactants may be in a liquid phase, a mixed liquid-vapor phase, or a vapor phase when they contact the catalyst, with best results obtained in the vapor phase.

In the case where the bimetallic catalyst of the present invention is used in a reforming operation, the reforming system will comprise a reforming zone containing a fixed bed of the catalyst type previously characterized. This reforming zone may be one or more separate reactors with suitable heating means therebetween to compensate for the endothermic nature of the reactions that take place in each catalyst bed. The hydrocarbon feed stream that is charged to this reforming system will comprise hydrocarbon fractions containing naphthenes and paraffins that boil within the gasoline range. The preferred charge stocks are those consisting essentially of naphthenes and paraffins, although in many cases aromatics are also present. This preferred class includes straight run gasolines, natural gasolines, synthetic gasolines, and the like. On the other hand, it is frequently advantageous to charge thermally or catalytically cracked gasolines or higher boiling fractions thereof. Mixtures of straight run and cracked gasolines can also be used to advatange. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. In some cases, it is also advantageous to charge pure hydrocarbons or mixtures of hydrocarbons that have been extracted from hydrocarbon distillates—for example, straight chain paraffins—which are to be converted to aromatics. It is preferred that these charge stocks be treated by conventional catalytic pretreatment methods such as hydrorefining, hydrotreating, hydrosulfurization, etc., to remove substantially all sulfurous, nitrogenous, and water-yielding contaminants therefrom, and to saturate any olefins that may be contained therein.

In other hydrocarbon conversion embodiments, the charge stock will be of the conventional type customarily used for the particular kind of hydrocarbon conversion being effected. For example, in typical isomerization embodiments the charge stock can be a paraffinic stock rich in $C_4$ to $C_8$ normal paraffins, or a normal butane-rich stock, or an n-hexane-rich stock, or a mixture of alkylaromatics such as a mixture of xylenes, etc. In dehydrogenation, the charge stock can be any dehydrogenatable hydrocarbon. In hydrocracking embodiments the charge stock will be typically a gas oil, heavy cracked cycle oil, etc. Likewise, pure hydrocarbons or substantially pure hydrocarbons can be converted to more valuable products by using the bimetallic catalyst of the present invention in any of the hydrocarbon conversion processes known to the art that use a dual-function catalyst.

In a reforming embodiment it is generally preferred to utilize the novel bimetallic catalyst in a reaction environment in which the amount of water present therein is held to carefully controlled levels. Essential to the achievement of this objective is the control of the amount of water, or its equivalent, present in the charge stock and in the hydrogen stream which are passed to the reforming zone. Best results are ordinarily obtained when the total amount of water or water-producing compounds entering the reforming zone from any source is held to a level in the range corresponding to about 5 to about 50 wt. p.p.m., expressed as weight of equivalent water in the charge stock. When the amount of water entering this zone is above this preferred range, a significant reduction in water level can be accomplished by careful control of the water present in the charge stock and/or in the hydrogen stream. The charge stock and/or the hydrogen stream can be dried by using any suitable drying means known to those skilled in the art such as conventional solid adsorbents having a high selectivity for water; for instance, sodium or calcium crystalline aluminosilicate, silica gel, activated alumina, molecular sieves, anhydrous calcium sulfate, high surface area sodium, and the like adsorbents.

Similarly, the water content of the charge stock may be adjusted by a conventional water-stripping operation in a fractionating column or like devices. And, in some cases, a combination of adsorbent drying and distillation drying may be beneficially used to effect almost complete removal of water from the charge stock. In the case where the total amount of water or water-producing substances entering the reforming zone is below the desired range, the required amount of water can be achieved by introducing into the reforming zone in any manner a suitable water additive such as water per se or an oxygen-containing substance that is reductible to water at catalyst reforming conditions. Typical oxygen-containing reducible compounds that may be utilized are the alcohol, the aldehydes, the ketones and the like.

In the reforming embodiment, an effluent stream is withdrawn from the reforming zone and passed through a cooling means to a separation zone, typically maintained at about 25 to 150° F. wherein a hydrogen-rich gas is separated from a high octane liquid product, commonly called an unstabilized reformate. This hydrogen-rich gas is withdrawn from the separating zone, and when the water level in the reforming zone is too high, at least a portion thereof passed through an adsorption zone containing an adsorbent selective for water. A major portion of this hydrogen-rich gas stream, plus the dried hydrogen stream when drying is used, is then recycled through suitable compressing means back to the reforming zone. The liquid phase from the separating zone is then typically withdrawn and commonly treated in a fractionating system in order to adjust its butane concentration in order to control front-end volatility of the resulting reformate.

The conditions utilized in the numerous hydrocarbon conversion embodiments of the present invention are those customarily used in the art for the particular reaction or combination of reactions that is to be effected. For instance, alkylaromatic and paraffin isomerization conditions include: a temperature of about 32° to about 1000° F. and preferably about 75 to about 600° F.; a pressure of atmospheric to about 100 atmospheres; hydrogen to hydrocarbon mole ratio of about 0.5 to about 20:1 and an LHSV (calculated on the basis of equivalent liquid volume of the charge stock contacted with the catalyst per hour divided by the volume of conversion zone containing catalyst) of about 0.2 hr.$^{-1}$ to 10 hr.$^{-1}$. Dehydrogenation conditions include: a temperature of about 700 to about 1250° F., a pressure of about 0.1 to about 10 atmospheres, a liquid hourly space velocity of about 1 to 40 hr.$^{-1}$ and a hydrogen to hydrocarbon mole ratio of about 1:1 to 20:1. Likewise, typically hydrocracking conditions include: a pressure of about 400° F. to about 900° F.; an LHSV of about 0.1 hr.$^{-1}$ to about 10 hr.$^{-1}$; and hydrogen circulation rates of about 1000 to 10,000 s.c.f. per barrel of charge.

In the reforming embodiment of the present invention, the pressure utilized is preferably selected in the range of about 0 p.s.i.g. to about 1000 p.s.i.g., with best results obtained at about 50 to about 350 p.s.i.g. In fact, it is a singular advantage of the present invention that it allows stable operation at lower pressures than have heretofore been successfully utilized in so-called "continuous" reforming systems (i.e., reforming for periods of about 15 to about 200 or more barrels of charge per pound of catalyst without regeneration). In other words, the bimetallic catalyst of the present invention allows the operation of a continuous reforming system to be conducted at lower pressure (i.e., 50 to 350 p.s.i.g.) for about the same or better catalyst life before regeneration as has been heretofore realized with conventional catalysts at higher pressures (i.e., 400 to 600 p.s.i.g.).

Similarly, the temperature required for reforming is generally lower than that required for a similar reforming operation using a high quality platinum-containing catalyst of the pior art. This significant and desirable feature of the present invention is a consequence of the selectivity of the catalyst of the present invention for the octane-upgrading reactions that are preferably induced in a typical reforming operation. Hence, the present invention requires a temperature in the range of from about 800° F. to about 1100° F. and preferably about 900° F. to about 1050° F. As is well known to those skilled in the continuous reforming art, the initial selection of the temperature within this broad range is made primarily as a function of the desired octane of the product reformate considering the characteristics of the charge stock and of the catalyst. Ordinarily, the temperature then is thereafter slowly increased during the run to compensate for the inevitable deactivation that occurs to provide a constant octane product. Therefore, it is a feature of the present invention that the rate at which the temperature is increased in order to maintain a constant octane product, is substantially lower for the bimetallic catalyst of the present invention than for a high quality reforming catalyst which is manufactured in exactly the same manner as the catalyst of the present invention except for the inclusion of the tin component. Moreover, for the catalyst of the present invention, the $C_5^+$ yield loss for a given temperature increase is substantially lower than for a high quality reforming catalyst of the prior art. In addition, hydrogen production is substantially higher.

The reforming embodiment of the present invention also typically utilizes sufficient hydrogen to provide an amount of about 2 to about 20 moles of hydrogen per mole of hydrocarbon entering the reforming zone, with excellent results being obtained when about 5 to about 10 moles of hydrogen are used per mole of hydrocarbon. Likewise, the liquid hourly space velocity (LHSV) used in reforming is selected from the range of about 0.1 to about 10 hr.$^{-1}$ with a value in the range of about 1 to about 5 hr.$^{-1}$ being preferred. In fact, it is a feature of the present invention that, for the same severity level, it allows operations to be conducted at higher LHSV than normally can be stably achieved in a continuous reforming process with a high quality reforming catalyst of the prior art. This last feature is of immense economic significance because it allows a continuous reforming process to operate at the same throughput level with less catalyst inventory than that heretofore used with conventional reforming catalyst at no sacrifice in catalyst life before regeneration.

The following examples are given to illustrate further the preparation of the catalytic composite of the present invention and the use thereof in the conversion of hydrocarbons. It is understood that the examples are given for the sole purpose of illustration and are not to be considered to limit unduly the generally broad scope and spirit of the appended claims.

Example I

This example demonstrates one method of preparing the type of platinum-tin catalytic composite disclosed in my prior application.

An alumina carrier material comprising $\frac{1}{16}''$ spheres was prepared by: forming an aluminum hydroxyl chloride sol by dissolving substantially pure aluminum pellets in a hydrochloric acid solution, adding hexamethylenetetramine to the resulting sol, gelling the resulting solution by dropping it into an oil bath to form spherical particles of an aluminum hydrogel, aging, and washing the resulting particles, and finally drying and calcining the aged washed particles to form spherical particles of gamma-alumina containing about 0.3 wt. percent combined chloride. Additional details as to this method of preparing the preferred carrier material are given in the teachings of U.S. Pat. No. 2,620,314.

The resulting gamma-alumina particles were then contacted with an impregnation solution containing chloroplatinic acid, hydrogen chloride and stannic chloride in amounts sufficient to yield a final composite containing 0.75 wt. percent platinum and 0.5 wt. percent tin, calculated on an elemental basis. The amount of hydrogen chloride in the solution corresponded to about 2 wt. percent of the alumina particles. The impregnated spheres were then dried at a temperature of about 300° F. for about an hour and thereafter calcined in an air atmosphere at a temperature of about 975° F. for about 1 hour. The resulting calcined spheres were then contacted with an air stream containing $H_2O$ and HCl in a mole ratio of about 40:1 to about 80:1 for about 2 hours at 975° F. Thereafter, the catalyst was render in situ under substantially water-free conditions.

The resulting catalyst particles were analyzed and found to contain, on an elemental basis, about 0.75 wt. percent platinum, about 0.5 wt. percent tin, and about 1.06 wt. percent chloride. The resulting catalyst is designated catalyst "A."

Example II

This example illustrates a method of preparing the improved catalytic composite of the present invention.

An aluminum hydroxyl chloride sol was prepared by dissolving substantially pure aluminum pellets in a hydrochloric acid solution. Thereafter, an amount of stannic chloride calculated to provide a final catalyst containing 0.5 wt. percent tin was dissolved in this sol. The resulting solution was then vigorously stirred in order to evenly distribute the tin moiety throughout the sol. Hexamethylenetetramine was then added to the resulting mixture to form a dropping solution which was subsequently gelled by dropping it into an oil bath in a manner selected to form spherical particles of an aluminum hydrogel having an average diameter of about 1/16". The resulting spherical hydrogel particles were then aged and washed in an ammoniacal solution, and thereafter dried and calcined to form gamma-alumina particles containing 0.3 wt. percent combined chloride and approximately 0.5 wt. percent tin in the form of tin oxide. Additional details as to the mechanics associated with this method of carrier material preparation are given in the teachings of U.S. Pat. No. 2,620,314.

The resulting particles comprised an intimate combination of tin oxide with alumina. They were then impregnated with an aqueous solution containing chloroplatinic acid and hydrogen chloride in amounts sufficient to yield a final composite containing about 0.75 wt. percent platinum. The amount of hydrogen chloride used was equal to 2 wt. percent of the carrier particles. The impregnated spheres were then dried at a temperature of about 300° F. for about 1 hour and calcined in an air atmosphere at a temperature of about 975° C. for about 1 hour. Thereafter, the resulting calcined spheres were subjected to contact with an air stream containing $H_2O$ and HCl in a mole ratio of about 40:1 to about 80:1 for about 2 hours at about 975° F.

Thereafter the spheres were subjected to a dry pre-reduction treatment by contacting them with a substantially pure hydrogen stream containing substantially less than 20 vol. p.p.m. $H_2O$ at a temperature of about 1025° F., a pressure slightly above atmospheric, and a flow rate of the hydrogen stream through the catalyst particles corresponding to a gas hourly space velocity of about 720 hr.$^{-1}$ for a period of about 1 hour. The resulting pre-reduced catalyst was then contacted with a substantially water-free gaseous mixture of $H_2$ and $H_2S$ containing a mole ratio of $H_2$ to $H_2S$ of about 10:1 at conditions substantially identical to those used during the pre-reduction steps.

The resulting catalyst was analyzed and found to contain, on an elemental basis, about 0.75 wt. percent platinum, about 0.5 wt. percent tin, about 0.9 wt. percent chloride, and about 0.1 wt. percent sulfur. It is hereinafter designated catalyst "B." The principal distinctions between catalyst "B" and catalyst "A" relate to their method of preparation (the tin component was incorporated in catalyst "A" by simultaneous impregnation and in catalyst "B" by coprecipitation with the carrier material) and to the pretreatment performed thereon (i.e. catalyst "A" was not pre-reduced and sulfided and is used in the oxidized form with subsequent reduction in situ during start-up, whereas catalyst "B" was pre-reduced and sulfided).

Example III

In order to compare these platinum-tin catalytic composites with those of the prior art in a manner calculated to bring out the beneficial effects of the tin component, a comparison test was made between the catalysts "A" and "B" and two control catalysts, catalysts "C" and "D," which were made in exactly the same manner as given above for catalyst "A" and "B" except that they were prepared substantially free of the tin component. That is to say, catalylst "C" is a combination of platinum and chlorine with a gamma-alumina carrier material in an amount sufficient to result in the catalyst containing, on an elemental basis, about 0.75 wt. percent platinum, and about 0.85 wt. percent chlorine. Likewise, catalyst "D" is a combination of platinum and chlorine with gamma-alumina in an amount sufficient to result in a catalyst containing, on an elemental basis, 0.75 wt. percent platinum, 0.85 wt. percent chloride, and about 0.1 wt. percent sulfur. Catalysts "C" and "D" are emblematic of high quality commercial reforming catalysts.

These catalysts were then separately subjected to a high stress evaluation test designed to determine their relative activity and selectivity for the reforming of a gasoline boiling range charge stock. In all tests the same charge stock was utilized, its characteristics are given in Table I. It is to be noted that this test is conducted under a substantially water-free condition with the only significant source of water being the 5.9 wt. p.p.m. in the charge stock.

TABLE I.—ANALYSIS OF HEAVY KUWAIT NAPHTHA

| | |
|---|---|
| API gravity at 60° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatics, vol. percent | 8 |
| Paraffins, vol. percent | 71 |
| Naphthenes, vol. percent | 21 |
| Water, p.p.m. | 5.9 |
| Octane No., F–1 clear | 40.0 |

This test was specifically designed to determine in a very short time period whether the catalyst being evaluated has superior characteristics for the reforming process. It consists of six periods comprising a six hour line-out period and three ten-hour test periods run at a constant temperature of about 970° F., followed by another six hour line-out period and three ten-hour test periods run at a constant temperature of about 1000° F. It was performed in a laboratory scale reforming plant comprising a reactor containing the catalyst to be evaluated, hydrogen separation zone, a debutanizer column, suitable heating, pumping and condensing means, etc.

In this plant, a hydrogen recycle stream and the charge stock are commingled and heated to the desired conversion temperature. The resulting mixture is then passed downflow into a reactor containing the catalyst as a fixed bed. An effluent stream is then withdrawn from the bottom of the reactor, cooled to about 55° F., and passed to the separating zone wherein a hydrogen-rich gaseous phase separates from a liquid phase. A portion of the gaseous phase is continuously passed through a high surface area sodium scrubber and the resulting substantially water-free hydrogen stream recycled to the reactor in order to supply hydrogen for the reaction, and the excess over the needed for plant pressure is recovered as excess separator gas. Moreover, the liquid phase from the separating zone is withdrawn therefrom and passed to the debutanizer column wherein light ends are taken overhead as debutanizer gas and a $C_5+$ reformate stream recovered as bottoms.

Conditions utilized in this test are: a constant temperature of about 970° F. for the first three periods followed by a constant temperature of about 100° F. for the last three periods, a liquid hourly space velocity of 3.0 hr.$^{-1}$, an outlet pressure of the reactor of 100 p.s.i.g. and a mole ratio of hydrogen to hydrocarbon entering the reactor of about 8:1.

This two-temperature test is designed to quickly and efficiently yield two points on the yield-octane curve for the particular catalysts. The conditions utilized are selected on the basis of experience to yield the maximum amount of information on the capability of the catalyst being tested to respond to a high severity operation.

The results of separate tests performed on catalysts "A," "B," "C" and "D" are presented for each test period in Table II in terms of inlet temperature to the reactor in ° F., ratio of debutanizer gas make to total gas make, net excess separator gas in standard cubic feet per barrel of charge (s.c.f./bbl.), debutanizer overhead gas in s.c.f./bbl., F-1 clear octane number and hydrogen purity.

butanizer gas make (i.e. mainly $C_1$ to $C_4$), which is a rough measure of undesired hydrocracking and should be minimized for a highly selective catalyst. A sensative indicator of selectivity is then the ratio of debutanizer gas make to total gas make; it should be minimized for a highly selective catalyst. Referring again to the data presented in Table II and using these selectivity criteria, it is manifest that catalysts "A" and "B" are more selective than catalysts "C" and "D."

Accordingly, it is clear that tin is an efficient and effective promoter of a platinum metal-containing reforming catalyst and that the platinum-tin catalytic composites are more active and selective than high quality all platinum reforming catalysts of the prior art. It is to be noted that catalysts "A" and "B" have similar activity and selectivity characteristics in this test; this is primarily a consequence of the conditions utilized in this test. More severe conditions are necessary in order to discriminate between them as will appear hereinafter.

Example IV

In order to measure stability characteristics of the improved catalytic composite of the present invention vis-a-vis a high quality catalyst of the prior art, a slightly dif-

TABLE II.—RESULTS OF ACCELERATED REFORMING TESTS FOR CATALYSTS A, B, C, AND D

| Period No. | Temperature, ° F. | Gas ratio | Separator gas, s.c.f./bbl. | Hydrogen purity, mole percent | Debutanizer gas, s.c.f./bbl. | Octane No. F-1 clear |
|---|---|---|---|---|---|---|
| Catalyst A [1] | | | | | | |
| 1 | 972 | .046 | 1,485 | 88.0 | 72 | 95.6 |
| 2 | 972 | .041 | 1,439 | | 62 | 94.6 |
| 3 | 972 | .042 | 1,433 | 88.7 | 62 | 94.5 |
| 4 | 1,006 | .041 | 1,669 | 86.9 | 72 | 99.2 |
| 5 | 1,006 | .041 | 1,638 | | 70 | 98.6 |
| 6 | 1,006 | .041 | 1,597 | 87.2 | 69 | 98.2 |
| Catalyst C [2] | | | | | | |
| 1 | 975 | .063 | 1,342 | 79.6 | 90 | 95.6 |
| 2 | 970 | .055 | 1,254 | | 73 | 92.5 |
| 3 | 971 | .053 | 1,229 | 84.7 | 69 | 90.8 |
| 4 | 1,005 | .052 | 1,398 | 82.9 | 77 | 95.9 |
| 5 | 1,006 | .054 | 1,378 | 82.5 | 78 | 95.5 |
| 6 | 1,006 | .055 | 1,390 | 82.2 | 81 | 94.9 |
| Catalyst B [3] | | | | | | |
| 1 | 972 | .048 | 1,470 | 87.8 | 75 | 96.6 |
| 2 | 972 | .043 | 1,441 | | 66 | 95.5 |
| 3 | 972 | .044 | 1,393 | 88.8 | 64 | 94.7 |
| 4 | 1,010 | .043 | 1,598 | | 71 | 98.7 |
| 5 | 1,010 | .043 | 1,569 | 87.4 | 70 | 98.0 |
| 6 | 1,004 | .043 | 1,542 | 87.3 | 70 | 98.0 |
| Catalyst D [4] | | | | | | |
| 1 | 963 | .049 | 1,338 | 85.3 | 69 | 93.6 |
| 2 | 963 | .050 | 1,301 | | 69 | 92.7 |
| 3 | 963 | .054 | 1,258 | 85.4 | 72 | 92.0 |
| 4 | 997 | .060 | 1,414 | | 90 | 96.3 |
| 5 | 997 | .062 | 1,359 | 81.4 | 90 | 95.3 |
| 6 | 997 | .064 | 1,330 | 81.0 | 91 | 94.5 |

[1] Weight percent of— Pt, 0.75; Sn, 0.5; Cl, 1.06.
[2] Weight percent of— Pt, 0.75; Cl, 0.85.
[3] Weight percent of— Pt, 0.75; Sn, 0.5; Cl, 0.9; S, 0.1.
[4] Weight percent of— Pt, 0.75; Cl, 0.88; S, 0.1.

Recalling that catalysts "A" and "B" are the promoted catalysts and that catalysts "C" and "D" are the control catalysts, it is evident from data presented in Table II that the platinum-tin catalysts are sharply superior to the control catalysts in both activity and selectivity. As was pointed out hereinbefore, a good measure of activity for a reforming catalyst is octane number of reformate produced at the same condition; on this basis, catalysts "A" and "C" were more active than catalysts "C" and "D" at both temperature conditions. However, activity is only half of the story; activity must be coupled with selectivity to demonstrate superiority. Selectivity is measured directly by reference to $C_5+$ yield and indirectly by reference to separator gas make, which is roughly proportional to net hydrogen make which in turn is a product of the preferred upgrading reaction, and by reference to deferent comparison test was performed on catalyst "B" and its control, catalyst "D." This test was designed to measure, on an accelerated basis, the stability characteristic of the catalyst being tested in a high severity reforming operation.

The test consisted of six periods of 24 hours each with each period being made up of a 12 hour line-out being followed by a 12 hour test. The characteristics of the charge stock used are reported in Table I. The conditions employed were: an outlet reactor pressure of 100 p.s.i.g., a liquid hourly space velocity of 1.5 hr.$^{-1}$, a hydrogen to hydrocarbon mole ratio of 8:1, and an inlet temperature which was continuously adjusted throughout the test in order to maintain a $C_5+$ target octane of 102 F-1 clear. It is to be noted that there are exceptionally severe conditions.

The reforming plant utilized was identical in structure and flow scheme to that described in Example III.

The results of the comparison test are recorded in Table III in terms of temperature required to make 102 F-1 clear octane $C_5+$ yield, and gas separator and debutanizer makes, ratio of debutanizer gas to total gas make and hydrogen purity.

TABLE III.—RESULTS OF HIGH STRESS STABILITY TEST FOR CATALYSTS B AND D

| Period No. | Temperature, °F. | $C_5+$, volume percent | Gas ratio | Separator gas, s.c.f./bbl. | Hydrogen purity, mole percent | Debutanizer gas s.c.f./bbl. |
|---|---|---|---|---|---|---|
| Catalyst B:[1] | | | | | | |
| 1 | 972.5 | 74.9 | 0.43 | 1,796 | 83.2 | 80 |
| 2 | 981.0 | 76.2 | 0.40 | 1,831 | 84.5 | 76 |
| 3 | 990.5 | 74.9 | 0.41 | 1,787 | 83.0 | 77 |
| 4 | 996 | 74.4 | 0.43 | 1,778 | 82.2 | 80 |
| 5 | | | | | | |
| 6 | 1,012 | 72.6 | 0.48 | 1,772 | 79.5 | 90 |
| Catalyst D:[2] | | | | | | |
| 1 | 978.5 | 69.4 | .056 | 1,819 | 75.6 | 108 |
| 2 | 993.5 | 69.9 | .057 | 1,788 | 75.4 | 107 |
| 3 | 1,021.5 | 69.8 | .060 | 1,751 | 72.3 | 112 |
| 4 | 1,045 | 62.5 | .081 | 1,721 | 61.6 | 152 |
| 5 | 1,103 | | | | | |
| 6 | | | | | | |

[1] Weight percent of— Pt, 0.75; Sn, 0.5; Cl 0.9; S, 0.1.
[2] Weight percent of— Pt, 0.75; Cl 0.85; S, 0.1.

Referring to Table III, it is evident that the catalyst of the present invention, catalyst "B," is materially more stable than the control catalyst, catalyst "D." This is true both in the areas of temperature stability and of yield stability. Even more surprising, $C_5+$ yield for catalyst "B" is consistently above that produced by catalyst "D." Hence, this accelerated stability test provides additional evidence of the synergistic effect of the tin component on the platinum-containing catalyst and of the significant advance in the reforming art enabled thereby.

Example V

In order to demonstrate the substantially improved results that are obtained when the tin component is evenly distributed in the carrier material, a series of experiments were performed in which the only variable was the degree of distribution of the tin moiety of an alumina carrier material. It is a general rule in the art of impregnating carrier materials with metallic components in aqueous solutions that the degree of dispersion of the metal moiety in the support is directly related to the acidity level used in the impregnation solution. Accordingly, the degree of dispersion increases as more and more acid is added to the impregnation solution until a point of uniform dispersion is reached. The degree of dispersion of the metal moiety in the carrier can be directly ascertained in a number of ways such as by use of electron microprobe analysis to scan a cross-section of a catalyst pellet, by measuring crystallite size, by carefully grinding off the outer regions of a catalyst particle and subjecting each separate region to analysis and the like techniques. When the performance of the catalyst is directly responsive to the distribution of the ingredient to be studied, the degree of dispersion can be indirectly established by making a series of catalyst with different degrees of dispersions and checking their performance in a standard test. This latter procedure was utilized in the present case to ascertain the minimum level of acidity in a tin-containing aqueous impregnation solution which is necessary in order to achieve a uniform dispersion of the tin moiety in the support.

A series of catalysts were then prepared according to the recipe given in Example I with the exceptions that the amount of HCl included in the impregnation solution was varied over the range corresponding to about 2 to about 10 wt. percent of the alumina spheres that were impregnated. Specifically, catalyst "E" was prepared with 2% HCl; catalyst "F" with 3% HCl; catalyst "G" with 7.5% HCl; and catalyst "H" with 10% HCl. All of these catalysts were finished in exactly the same manner to result in catalysts having compositions corresponding to 0.4 wt. percent tin, 0.6 wt. percent platinum and about 1.0 wt. percent chlorine.

These catalysts were then separately subjected to the high severity reforming stability test described in Example IV with the charge stock described in Table IV at the following conditions: a target octane of 102 F-1 clear, a reactor outlet pressure of 100 p.s.i.g., an LHSV of 1.5 hr.$^{-1}$ and a hydrogen to hydrocarbon mole ratio of 4:1. It is to be noted that these are more severe conditions than utilized in the previous examples. The reason for this is to increase the discriminating capability of the test. That is, all of these catalysts are excellent catalysts when compared to all platinum catalysts; therefore, a much more stringent test is necessary to discern subtle differences among them.

TABLE IV.—ANALYSIS OF HEAVY KUWAIT NAPHTHA

| | |
|---|---|
| API gravity at 60° F. | 60.3 |
| Initial boiling point, ° F. | 170 |
| 10% boiling point, ° F. | 195 |
| 50% boiling point, ° F. | 238 |
| 90% boiling point, ° F. | 316 |
| End boiling point, ° F. | 375 |
| Sulfur, wt. p.p.m. | 0.1 |
| Nitrogen, wt. p.p.m. | 0.1 |
| Aromatics, vol. percent | 10 |
| Paraffins, vol. percent | 70 |
| Naphthenes, vol. percent | 20 |
| Water, wt. p.p.m. | 25 |
| Chloride, wt. p.p.m. | 1 |
| Octane No., F-1 clear | 40 |

The results of the comparison tests for these catalysts are presented in Table V in terms of reaction temperature necessary to make octane, excess separator gas in s.c.f./bbl., debutanizer gas in s.c.f./bbl., the ratio of debutanizer gas make a total gas make, $C_5+$ vol. percent yield and hydrogen purity of excess recycle gas.

TABLE V.—RESULTS OF STABILITY TESTS ON CATALYSTS "E", "F", "G" AND "H"

| Period No. | Temperature, °F. | $C_5+$, volume percent | Separator gas, s.c.f./bbl. | Debutanizer gas, s.c.f./bbl. | Gas ratio | Hydrogen purity |
|---|---|---|---|---|---|---|
| Catalyst E: | | | | | | |
| 1 | 969.5 | 74.8 | 1,790 | 85 | .045 | 84.2 |
| 2 | 977.5 | 74.9 | 1,778 | 80 | .043 | 83.9 |
| 3 | | | | | | |
| 4 | 992 | 74.7 | 1,765 | 86 | .046 | 84.1 |
| 5 | | | | | | |
| 6 | 1,014.5 | 73.7 | 1,767 | 41 | .049 | 82.1 |
| Catalyst F: | | | | | | |
| 1 | 971 | 74.8 | 1,820 | 84 | .044 | 84.2 |
| 2 | 978 | 74.7 | 1,855 | 85 | .044 | 84.5 |
| 3 | | | | | | |
| 4 | 998.5 | 74.1 | 1,851 | 84 | .043 | 83.7 |
| 5 | | | | | | |
| 6 | 1,014 | 73.7 | 1,831 | 88 | .046 | 82.4 |
| atalyst G: | | | | | | |
| 1 | 964.5 | 75.9 | 1,896 | 73 | .037 | 86.6 |
| 2 | 974 | 75.8 | 1,907 | 69 | .035 | 86.3 |
| 3 | | | | | | |
| 4 | 987.5 | 77.1 | 1,807 | 64 | .034 | 87.1 |
| 5 | | | | | | |
| 6 | 998 | 76.4 | 1,867 | 69 | .036 | 86.1 |
| Catalyst H: | | | | | | |
| 1 | 968 | 74.9 | 1,879 | 77 | .039 | 84.8 |
| 2 | 977 | 75.6 | 1,888 | 74 | .038 | 86.0 |
| 3 | | | | | | |
| 4 | 983.5 | 77.2 | 1,896 | 67 | .034 | 87.9 |
| 5 | | | | | | |
| 6 | 991.5 | 77.0 | 1,836 | 67 | .035 | 87.2 |

With reference now to the data presented in Table V it can be ascertained that the activity, selectivity and stability characteristics of the catalysts are significantly improved as the degree of dispersion of the tin component is increased. Measuring activity by means of temperature required to make octane in the 6th period, it can be seen that catalyst "E" had on activity of 1014.5° F.; catalyst "F" had 1014° F.; catalyst "G" had 998° F.; and catalyst "H" had 991.5° F.

Similarly, measuring selectivity directly by means of the $C_5+$ yield during the 6th period and indirectly by means of the gas ratio in the 6th period, the following selectivity data is obtained:

| Catalyst | $C_5+$ yield, mol percent | Gas ratio |
|---|---|---|
| E | 73.7 | .049 |
| F | 73.7 | .046 |
| G | 76.4 | .036 |
| H | 77.0 | .035 |

The superiority of catalysts "G" and "H" in selectivity characteristics is thus manifest.

Stability is a little more difficult to precisely measure in this type of test, but a rough measure of acivity stability is the temperature differential over the six periods of the test and a good measure of selectivity stability is the $C_5+$ yield differential over the six periods of the test. On this basis the stability comparison is as follows:

| Catalyst | Activity stability, °F. | Selectivity stability, volume percent |
|---|---|---|
| E | +45 | −1.1 |
| F | +43 | −1.1 |
| G | +33.5 | +.5 |
| H | +23.5 | +2.1 |

Catalysts "G" and "H" have materially smaller temperature differentials which directly correlates with better activity stability. Likewise, their selectivity stability is much better than catalysts "E" and "F."

From this series of experiments it can be concluded that at least about 5 wt. percent of acid in the aqueous impregnation solution is necessary to achieve a uniform dispersion of the tin component in the carrier material and thereby enable the improvement of the present invention.

Example VI

Having established the necessity for a uniform dispersion of the tin component, the remaining factor to consider is the particle size of the tin component in the carrier material. This parameter can be studied by adding finely divided insoluble particles of the tin component in the required size to an alumina sol, evenly distributing the particles throughout the sol and gelling the resulting sol to obtain a carrier having the tin component evenly distributed therethrough in the required size. If the tin component is added to the sol in a soluble form the particle size of the tin component in the resulting carrier will be less than 100 A. because it will be present in essentially molecular units.

Accordingly in order to demonstrate the significance of this particle size parameter, two runs were made with catalysts having identical composition but different tin particle size. The first catalyst, catalyst "I", was prepared by adding finely divided solid particles of insoluble tin oxide to the sol in the manner described. The particle size was in the range of 1 to 10 microns or more. The second catalyst, catalyst "J," was made by adding the tin component to the sol in the form of a soluble salt (stannous chloride) so that the particle size of the tin component in the resulting catalyst was less than 100 A. in maximum dimension.

These catalysts were then compared in stability tests which were identical to those described in Example IV. The results of these runs are presented in Table VI in terms identical to those utilized in Table V.

TABLE VI.—RESULTS OF STABILITY TESTS ON CATALYSTS "I" AND "J"

| Period No. | Temperature, °F. | C₅+, volume percent | Separator gas, s.c.f./bbl. | Debutanizer gas, s.c.f./bbl. | Gas ratio | Hydrogen purity |
|---|---|---|---|---|---|---|
| Catalyst "I": | | | | | | |
| 1 | 968 | 70.1 | 1,678 | 116 | .065 | 76.7 |
| 2 | 990 | 68.3 | 1,680 | 132 | .073 | 73.4 |
| 3 | 1,014 | 63.9 | 1,621 | 160 | .090 | 66.0 |
| 4 | 1,050 | 55.6 | 1,568 | 224 | .125 | 53.4 |
| 5 | | | | | | |
| 6 | | | | | | |
| Catalyst "J": | | | | | | |
| 1 | 959 | | 1,773 | 86 | .046 | |
| 2 | 965.5 | | 1,779 | 84 | .045 | |
| 3 | 972 | | 1,757 | 84 | .046 | |
| 4 | 978.5 | 76.1 | 1,755 | 87 | .047 | 84.5 |
| 5 | 984.5 | | 1,736 | 85 | .047 | |
| 6 | 989.5 | 75.9 | 1,723 | 89 | .049 | 85.6 |

From a consideration of the data in Table VI and using the performance criteria previously discussed, the critical importance of particle size of the tin component is immediately manifest.

It is intended to cover by the following claims all changes and modifications of the above disclosure of the present invention that would be self-evident to a man of ordinary skill in the catalyst art or in the hydrocarbon conversion art.

I claim as my invention:

1. A catalytic composite comprising a combination of a platinum group component, a tin component and a halogen component with a porous carrier material, wherein the components are present in amounts sufficient to result in the composite containing, on an elemental basis, about 0.01 to about 2 wt. percent platinum group metal, about 0.01 to about 5 wt. percent tin and about 0.1 to about 3.5 wt. percent halogen, wherein the tin component is uniformly dispersed throughout the porous carrier material in a particle size which is less than 100 Angstroms in maximum dimension, wherein substantially all of the platinum group component is present as an elemental metal and wherein substantially all of the tin component is present in an oxidation state above that of the elemental metal.

2. A catalytic composite as defined as in claim 1 wherein the platinum group component is platinum meal.

3. A catalytic composite as defined as in claim 1 wherein the platinum group component is platinum metal.

4. A catalytic composite as defined as in claim 1 wherein the porous carrier material is a refractory inorganic oxide.

5. A catalytic composite as defined as in claim 4 wherein the refractory inorganic oxide is alumina.

6. A catalytic composite as defined as in claim 1 wherein the halogen component is chlorine or a compound, of chlorine.

7. A catalytic composite as defined as in claim 1 wherein the halogen component is fluorine or a compound of fluorine.

8. A catalytic composite as defined as in claim 1 wherein the tin component is tin oxide.

9. A catalytic composite comprising a combination of the catalytic composite defined in claim 1 with a sulfur component in an amount sufficient to result in a composite containing about 0.05 to about 0.5 wt. percent sulfur.

10. A catalytic composite as defined as in claim 1 wherein the atomic ratio of tin to platinum group metal contained in the composite is selected from the range of about 0.1:1 to about 3:1.

11. A catalytic composite as defined as in claim 1 wherein the composite contains, on an elemental basis, about 0.05 to about 1 wt. percent platinum group metal, about 0.1 to about 1 wt. percent tin and about 0.5 to about 1.5 wt. percent halogen.

12. A catalytic composite as defined as in claim 1 wherein the platinum group component is platinum metal, wherein the tin component is tin oxide, wherein the halogen component is chlorine or a compound of chlorine and wherein the porous carrier material consists essentially of gamma-alumina.

13. A process for converting a hydrocarbon which comprises contacting the hydrocarbon and hydrogen with a catalytic composite of claim 1 at hydrocarbon conversion conditions.

14. A process for reforming a gasoline fraction which comprises contacting the gasoline fraction and hydrogen with the catalytic composite defined in claim 1 at reforming conditions.

15. A process as defined as in claim 14 wherein the reforming conditions include a temperature of 800 to about 1100° C., a pressure from about 0 to about 1000 p.s.i.g., a liquid hourly space velocity of 0.1 to about 10 hr.$^{-1}$, and a mole ratio of hydrogen to hydrocarbon of 1:1 to about 20:1.

16. A process for reforming a gasoline fraction which comprises contacting the gasoline fraction and hydrogen with the catalytic composite defined in claim 12 at reforming conditions.

17. A process as defined as in claim 16 wherein the reforming conditions utilized include a pressure of about 50 to about 350 p.s.i.g.

References Cited

UNITED STATES PATENTS 3,632,503  1/1972  Hayes _____ 252—466 PT
3,245,920  4/1966  Keith et al. _____ 252—466 PT
3,686,340  8/1972  Patrick et al. _____ 208—138

HERBERT LEVINE, Primary Examiner

U.S. Cl. X.R.

252—466 PT, 441